(12) United States Patent
Schmitt et al.

(10) Patent No.: US 8,556,532 B2
(45) Date of Patent: Oct. 15, 2013

(54) JOINING COMPONENT

(75) Inventors: Klaus-Gisbert Schmitt, Giessen (DE); Andreas Becker, Alten-Buseck (DE); Reinhold Opper, Buseck (DE); Michael Schmidt, Fernwald (DE); Reimar Saltenberger, Niederwetz (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/112,230

(22) Filed: May 20, 2011

(65) Prior Publication Data

US 2011/0280650 A1    Nov. 17, 2011

Related U.S. Application Data

(63) Continuation of application No. PCT/EP2009/008119, filed on Nov. 14, 2009.

(30) Foreign Application Priority Data

Nov. 21, 2008   (DE) .................. 10 2008 059 243

(51) Int. Cl.
| | |
|---|---|
| B25G 3/34 | (2006.01) |
| F16B 11/00 | (2006.01) |
| F16B 12/04 | (2006.01) |
| F16L 13/00 | (2006.01) |

(52) U.S. Cl.
USPC .......................................................... 403/270

(58) Field of Classification Search
USPC ........ 403/265, 267, 269, 270; 285/21.1, 21.2, 285/294.3, 296.1; 137/318
See application file for complete search history.

(56) References Cited

U.S. PATENT DOCUMENTS

| | | | |
|---|---|---|---|
| 3,184,165 A * | 5/1965 | Carr ................................. 237/17 |
| 3,349,792 A * | 10/1967 | Larkin ........................ 137/318 |
| 4,029,837 A | 6/1977 | Leathermann | |
| 4,435,222 A | 3/1984 | Reed et al. | |
| 4,906,313 A * | 3/1990 | Hill ................................. 156/158 |
| 5,366,253 A | 11/1994 | Nakashiba et al. | |
| 5,904,377 A * | 5/1999 | Throup .......................... 285/39 |
| 7,385,163 B2 * | 6/2008 | Vorenkamp et al. .......... 219/617 |
| 7,815,988 B2 | 10/2010 | Stumpf et al. | |
| 2003/0116282 A1 * | 6/2003 | Hutter, III .................. 156/380.2 |
| 2005/0155654 A1 | 7/2005 | Vulkan et al. | |
| 2006/0191909 A1 | 8/2006 | Powell | |
| 2007/0220772 A1 * | 9/2007 | Kato et al. ....................... 33/708 |
| 2009/0103971 A1 * | 4/2009 | Krischker ........................ 403/1 |

FOREIGN PATENT DOCUMENTS

| | | |
|---|---|---|
| DE | 1291109 B | 3/1969 |
| DE | 102006059337 A | 6/2008 |
| DE | 102007022385 A | 11/2008 |
| EP | 2025959 A2 * | 2/2009 |
| FR | 1405668 A | 7/1965 |
| GB | 2203689 A * | 10/1988 |
| GB | 2408972 A | 6/2005 |
| GB | 2431135 B | 6/2008 |

* cited by examiner

*Primary Examiner* — Gregory Binda
*Assistant Examiner* — Nahid Amiri
(74) *Attorney, Agent, or Firm* — Michael P. Leary

(57) ABSTRACT

A joining component, for axial joining to a workpiece, comprises a base body composed of thermoplastic material and including a holding section and a flange section, with a joining surface including both a portion of the flange section and a metal section which can be heated inductively. The metal section is in this case integrated in the flange section.

19 Claims, 4 Drawing Sheets

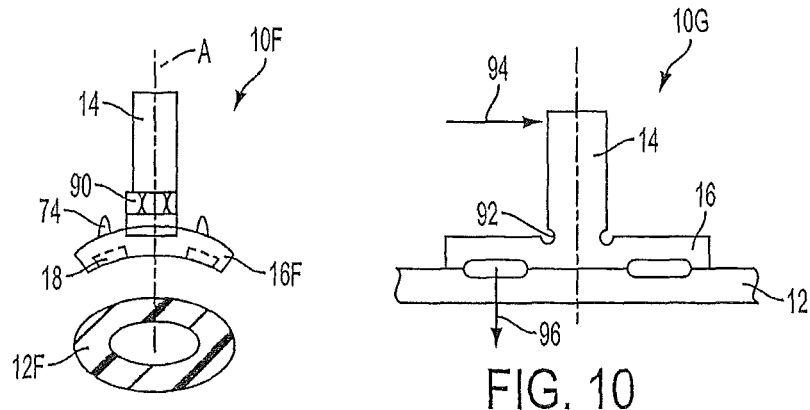
FIG. 9
FIG. 10
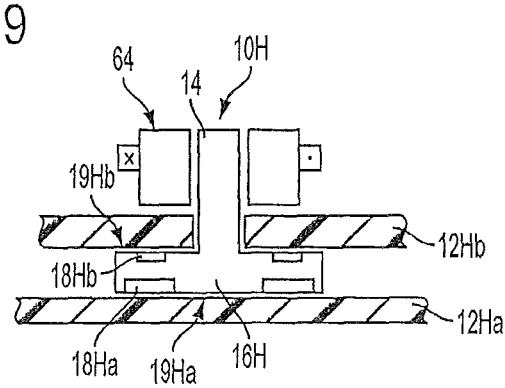
FIG. 11
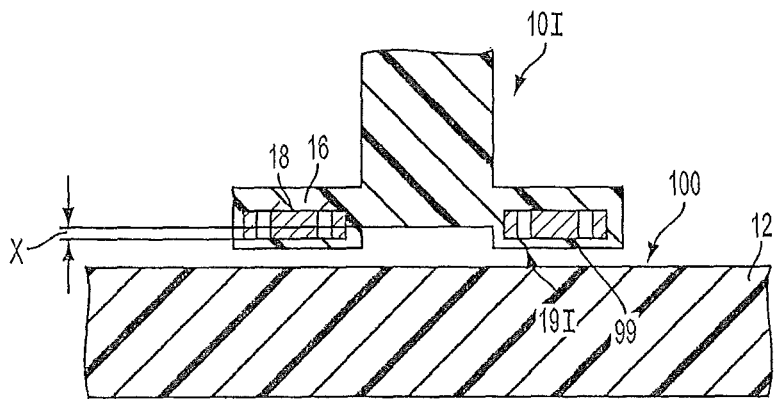
FIG. 12

JOINING COMPONENT

CROSS-REFERENCE TO RELATED APPLICATIONS

This application is a continuation of PCT/EP2009/008119, filed Nov. 14, 2009 which claims priority from German Patent Application No. 10 2008 059 243.9, filed on Nov. 21, 2008, the disclosure of which is incorporated herein by reference.

BACKGROUND OF THE INVENTION

The present invention relates to a joining component for axial joining to a workpiece, having a base body composed of thermoplastic material which has a holding section and a flange section, with a joining surface being formed on the flange section and having a metal section which can be heated inductively.

The invention also relates to a method for production of such a joining component.

In general, the present invention relates to the field of joining of joining components, such as attachment elements, to workpieces, such as bodywork components. In this case, an attachment element such as this generally has two functional sections, firstly the flange section by means of which the connection to the workpiece can be produced. Secondly, the joining component has a holding section which, for example, may be in the form of an attachment shaft in order to fix further attachment components to it, such as plastic clips. The clips may be designed to fix components such as lines, cable runs etc. On the other hand, a holding section such as this may also have different shapes, for example a hollow-cylindrical shape.

The document DE 10 2006 059 337 A1 discloses a method for connection of parts composed of thermoplastic material, with a joining component in the form of a holder being joined to a vehicle bumper bar composed of plastic. A connection element which has apertures, projections and/or depressions is arranged between those surfaces of the parts which are to be connected to one another, with the connection element being designed to be heated when a varying magnetic field is applied. This results in the thermoplastic material being fused onto the surfaces. When the molten material solidifies, this results in a connection at least between the surfaces and the connection element, and thus in a connection between the parts via the connection element. The connection element can be joined in advance to one of the parts to be connected.

One problem in the known method mentioned above is that the holder and the metallic connection element must in general be produced separately. The connection to the workpiece, such as the vehicle bumper bar, is therefore labour-intensive, since the connection element must be placed between them on each occasion. The alternative approach, of connecting the connection element to one of the components in advance, is likewise labour-intensive, since a further process step is required.

The document U.S. Pat. No. 4,435,222 discloses a further attachment element which comprises a shaft section and a conductive flange section, with a hot-meltable material being applied to the lower face of the conductive flange section. The attachment force which can generally be achieved is not very high with this joining component.

SUMMARY OF THE INVENTION

Against the above background, the object of the invention is to specify a better joining component and a better method for production of such a joining component.

According to a first aspect of the invention, the above object is achieved by a joining component of the type mentioned initially in which the metal section is integrated in the flange section.

Furthermore, the above object is achieved by a method for production of a joining component such as this, which includes a single-component injection-moulding process in which a metal element is extrusion coated.

According to a further aspect of the present invention, the above object is achieved by a method for production of a joining component which includes a two-component injection-moulding process, in which the base body is formed by a first, non-magnetic, thermoplastic material as the first component, and the metal section is formed by a second plastic material with metallic particles through it, which second plastic material forms a second component.

Finally, the object is achieved by a metal element for a joining component according to the invention.

In the case of the joining component according to the invention, the metal section is integrated in the flange section, such that the joining component forms a type of hybrid component composed of plastic and metal. The joining component can be joined directly to a workpiece, without any further process steps, in which case the metal section can be heated inductively in order to melt at least the thermoplastic material of the joining component. This allows the joining component to be joined to any desired surfaces, for example even to metal workpieces. In this case, the molten thermoplastic material forms a type of adhesive which is connected to the metal surface essentially with a force fit when the melt solidifies. When the joining component is being joined to a workpiece composed of thermoplastic material, its surface can also be melted, as a result of which it is also possible to achieve an integral fit connection (thermoplastic welding).

Finally, the metal element is preferably integrated in the flange section such that an interlock (positive fit) can be achieved between the thermoplastic material and the metal section in the radial direction and/or in the axial direction. This can be achieved, for example, by the metal section being integrated in the flange section such that the thermoplastic material of the base body and the metal section are arranged alongside one another in the radial direction.

The joining component according to the invention can furthermore be produced in a simple manner by means of the methods according to the invention, specifically by means of an injection-moulding process which can be carried out in a single mould. In the case of one method, a metal element to form the metal section is in this case arranged in the mould before the injection-moulding process, in such a way that it is extrusion coated with the thermoplastic material, at least partially.

In the second method, the base body is formed in a first step within the mould. In a second step, the metal section is formed within the same mould, and is connected to the first component within the mould.

The object is therefore achieved completely.

In the case of the joining component according to the invention, it is particularly advantageous, in particular for joining to thermoplastic components or to hybrid components with a thermoplastic surface, for the metal section to be integrated in the flange section in such a manner that the joining surface is formed by a surface section of the metal section and by a surface section of the flange section.

This measure allows plastic material on the base body to be connected quickly and directly to the surface of the workpiece during the joining process thus making it possible to produce firmer joint connections.

For joining, for example, to thermosetting plastic workpieces, which cannot be melted, it is particularly advantageous for the metal section to be integrated in the flange section in such a manner that the joining surface is formed completely by the thermoplastic workpiece of the flange section. A thin layer of thermoplastic on the metal part can thus, in an appropriately liquefied form, form force-fitting connections with thermosetting plastic workpieces and, in addition, can compensate for shape or positioning fluctuations in the joint zone.

According to a further preferred embodiment, an external circumference of the metal section is less than an external circumference of the flange section, in such a manner that the metal section is surrounded by a rim of the flange section.

This refinement makes it possible for the metal section to be completely enclosed in the finished joint connection, in particular in such a manner that corrosion problems can be avoided.

The rim of the flange section is in this case chosen such that at least its part which is adjacent to the flange section melts during the joining process and thus forms a connection to the workpiece surface (either of an integral or a force-fitting nature). The metal section is in this case preferably completely surrounded by the flange section and the workpiece.

In this case, it is particularly advantageous if the thickness of the rim in the radial direction is chosen such that the rim can be melted, in particular completely melted.

This makes it possible to ensure that the rim can completely surround the metal section, forming a bead. It is also possible to prevent a section of the rim which has not been melted from impeding the joining process, for example when the joining process is carried out such that the joining surface penetrates into the surface of the workpiece by an amount greater than zero.

For example, the rim may be smaller in the radial direction than the axial thickness of the flange section.

Furthermore, it is preferable for the rim to have a radial thickness of 0.5 mm or less.

It is also advantageous if the rim is aligned flush with the metal section and forms the joining surface with it.

This makes it possible to ensure that the rim forms an integral connection with a thermoplastic workpiece when being joined to the latter, in such a way that the metal section is held, effectively sealed, within the thermoplastic material.

Overall, furthermore, it is advantageous if the metal section has an axial aperture, with the flange section being axially recessed by an offset value with respect to the joining surface in the area of the aperture.

This measure makes it possible to ensure that the joining component can be pressed onto the workpiece, when being joined to thermoplastic workpieces, in such a manner that the joining surface penetrates under the surface of the workpiece, that is to say into the melt of the workpiece. This makes it possible to ensure a particularly good integral connection between the joining component and the workpiece.

The offset value may in this case correspond to the maximum possible penetration depth. This is the case in particular when the axial aperture is designed such the flange section is not melted at all, or is melted only slightly, in this area.

For example, it is particularly advantageous if the aperture is arranged in an axial projection where the holding section is connected to the flange section.

This makes it possible to introduce an inductive alternating field in the axial direction particularly efficiently into that area of the metal section which remains around the holding section. This also allows particularly uniform heating of the metal section, thus making it possible to achieve a homogeneous joint connection.

It is particularly advantageous in this case if the holding section has a shaft section which is connected to the flange section, with an external diameter of the shaft section being less than a diameter of the aperture.

This allows an inductive alternating field to be introduced particularly efficiently and homogeneously into the remaining, annular metal section.

Overall, it is particularly advantageous if the metal section has at least one axial hole whose opening points away from the joining surface.

This measure allows this axial hole to be filled with the thermoplastic material of the flange section, in such a manner that this results in a good, interlocking connection between the metal section and the flange section, in particular in the radial direction.

In a corresponding manner, the metal section may have at least one axial hole whose opening points towards the joining surface.

This measure allows thermoplastic material to penetrate into the axial hole in such a manner that a finished joint connection may have high strength in the radial direction.

Overall, however, it is particularly advantageous if the metal section has a plurality of axial through-holes.

Through-holes such as these make it possible for the thermoplastic material of the flange section to pass through to the surface of the workpiece, thus making it possible to increase the strength of the joint connection.

When using a thermoplastic workpiece, an integral connection can also be achieved in the area of these axial through-holes in such a manner that this results in a high-strength joint connection in the radial direction and in the axial direction.

In this case, it is particularly advantageous if at least two through-holes are arranged offset with respect to one another in the radial direction, with the radially outer hole being larger than the radially inner hole.

This measure makes it possible to heat the metal element more uniformly. This is particularly true when an inductive alternating field is introduced into the metal section, through the flange section, axially from above, in which case the return path of the inductive alternating field runs outwards, essentially in the radial direction.

The feature can furthermore be understood in such a way that the radially outer hole can also be made larger, by a plurality of radially outer holes being provided, that is to say the number of the radially outer holes is greater than the number of the radially inner holes.

In this context, it is furthermore advantageous if at least two through-holes are arranged offset with respect to one another in the radial direction, with a radial distance between the outer holes being less than a radial distance between the inner holes.

This measure can also contribute to making the heating of the metal section more uniform in the radial direction.

Overall, it is furthermore preferable if the metal section is connected to the flange section via undercut sections.

The undercut sections may be axial or radial holes in the metal section. However, the metal section may also have axially or radially projecting sections which project into the flange section.

For example, the metal section can be formed by a metal element in which U-shaped cutouts are incorporated, whose inner section is bent with respect to the surface of the metal element, in order to form undercut sections in the form of tongues.

However, it is also particularly advantageous if the metal section is produced from a flat metal element into which at least one through-hole is stamped, with a stamping burr which is produced in consequence forming an undercut section.

In consequence, during production of the joining element, the metal element is inserted into the mould such that that side of the metal element on which the stamping burrs are provided is adjacent to the flange section.

Although, with the joining element according to the invention, it is possible to ensure that the metal section is essentially completely surrounded in the finished joint connection, it is preferable if the metal section is produced from a flat metal element which is provided with an anticorrosion coating.

This makes it possible to avoid a corrosion problem when holes occur in the surrounding rim or bead.

According to a further preferred embodiment, the flange section has at least one projection on its outer surface opposite the joining surface, the area of which projection in an axial projection is very much smaller than that of the outer surface.

This makes it possible to apply a joining tool to the projection, in particular a field former, via which a magnetic alternating field is passed into the metal section. The fact that this section of the joining tool rests only on the projection and not flat on the entire outer surface makes it possible to prevent the joining tool from adhering to the outer surface of the flange section.

Furthermore, it is possible to ensure that the joining tool is always in a uniform position with respect to a metal section which is integrated in the flange section. This can also be designed for different types of joining components, in such a way that specific electrical controlling joining parameters can always be set to be the same, irrespective of the type of joining component.

The joining surface is typically formed on the side of the flange section pointing away from the holding section.

This makes it possible to ensure that the holding section projects opposite the closed surface of the workpiece in order to attach other components thereto, for example clips for indirect attachment of lines, cable runs or the like. On the other hand, lines, cable runs etc. such as these can also be attached directly to the holding section, if the holding section is appropriately shaped.

Finally, it is also possible to use the holding section as an anchor for attachment of lining parts, carpets, etc.

According to a further embodiment, the joining surface is formed on the side of the flange section pointing towards the holding section, with the flange section preferably having a holding projection on the side pointing away from the holding section.

In this embodiment, for example, the joining component can be attached to the workpiece in such a manner that its holding section projects through a hole in the workpiece. The joining component can easily be held by a joining tool, via the holding projection.

Overall, it is furthermore advantageous if the ratio of an axial thickness of the metal section to an axial thickness of the flange section is in the range from 1:2 to 1:10, in particular in the range from 1:3 to 1:6.

It is particularly preferable if the axial thickness of the metal section is less than or equal to 0.5 mm.

It is also advantageous if the metal section is ferromagnetic.

This makes possible to use an inductive alternating field more efficiently to heat the metal section.

Overall, the joining component has at least one of the following advantages and/or of the following features:

As a result of the special design, the joining component can be joined to a workpiece which is accessible from only one side. There is therefore no need to support the workpiece on the other side, behind the joint zone. The metal section may have any desired shape, but is preferably in the form of a flat section aligned at right angles to the axial direction. In an axial plan view, the metal section may be annular, in the form of a disc, round, oval, polygonal, cruciform etc.

The flange section may be flat or curved in order to allow joining to flat workpiece surfaces or to curved workpiece surfaces. The metal section may also be flat or curved, in a corresponding manner.

The metal section has at least one axial through-hole and preferably a maximum of four through-holes, if the joining component is intended to be used to produce an adhesively bonded connection between a metallic workpiece and the joining component. A force fit is essentially achieved in this case.

According to a further preferred embodiment, the metal section has at least one round, oval or polygonal hole and/or at least two elongated holes, the long sides of which may be round, oval or straight. An integral joint and/or an interlock can be achieved in this case.

Furthermore the holes may be arranged symmetrically with respect to a longitudinal axis of the joining component.

If corrosion protection is used, this may, for example, contain Zn/ZnNi.

Overall, the surface roughness of the metal section should be as high as possible, if it is in the form of a flat metal element. This can also be achieved, for example, by means of the corrosion coating.

A corrosion coating is at least 6 μm thick and, as mentioned above, has a highly rough surface in order to strengthen the force-fitting component of the joint connection.

A metal section may be formed on the front face and/or on the rear face of the flange section.

The metal section forms at least a part of the joining surface and preferably ends flush with at least the rim of the flange section.

The rim of the flange section, which surrounds the metal section, should be less than 1 mm and preferably greater than 0.1 mm, and is preferably in the range from 0.2 mm to 0.8 mm.

If the metal section is produced from a metal element, its thickness is preferably less than 0.5 mm, preferably less than 0.3 mm. In this case, the metal element can be produced from a metal film which, for example, is perforated (stamped), but may also be produced from a grid-like or mesh-like metal element.

If the metal section is formed by a plastic section with metallic particles, the metal particles may, for example, be metal microparticles or nanoparticles.

Furthermore, the joining component is designed such that the sum of the forces which can be transmitted by means of a force fit, interlock and/or integral connection (via the joint connection) are always at least greater, preferably at least 1.2 times greater, than the force which leads to a fracture at the junction between the holding section and the flange section or on the holding section itself.

If a projection is formed on the upper face of the flange section, this may be a continuous projection (for example annular), but may also be formed by at least two, preferably three and a maximum of four, projections in the form of points or rods. The height of the projections is preferably in the range from 0.2 to 2 mm.

The metal section is preferably composed of metal, but may also be produced from a different material, provided that this ensures that this material can be brought by external influence to a temperature that is higher than the melting temperature of the thermoplastic material of the joining component. In the case of a metal section, the heating can be carried out by magnetic induction (eddy currents) or else by electrical heating.

In general, the metal section is a thin section, which extends over an area, and may be in the form of a mesh or grid structure, or a foil. Furthermore, the metal section may also be formed by wires which are interwoven with one another.

The metal section may have a single metal element or else a plurality of individual metal elements, which together form the metal section.

The joining component should be designed (either on the upper face of the holding section or on some other section) such that the joining component can be held in a joining tool by reduced pressure.

The breaking strength of the joint zone of a joint connection which has been produced by means of a joining component according to the invention on a thermoplastic workpiece is preferably between 2 MPa and 20 MPa depending on the thermoplastic material in the case of material combinations of the same type and different material combinations. By way of example, POM, PP, PA66 or PA6 GF30 are suitable for use as a thermoplastic material. By way of example, POM, PP, PA6 GF30 are suitable for use as a thermoplastic material for the workpiece.

It is self-evident that the features mentioned above and those which are still to be explained in the following text can be used not only in the respectively stated combination but also in other combinations or on their own without departing from the scope of the present invention.

DESCRIPTION OF THE DRAWINGS

Exemplary embodiments of the invention are illustrated in the drawing, and will be explained in more detail in the following description. In the figures:

FIG. 9 shows a schematic longitudinal section view through a further embodiment of a joining component according to the invention;

FIG. 10 shows a schematic longitudinal section view through a further embodiment of a joining component according to the invention;

FIG. 11 shows a schematic longitudinal section view through a further embodiment of a joining component according to the invention; and FIG. 12 *shows* a schematic longitudinal section view through a joining part above a workpiece, in which the metal part of the joining part is completely surrounded by thermoplastic.

DETAILED DESCRIPTION OF THE PREFERRED EMBODIMENTS

Figure 1:
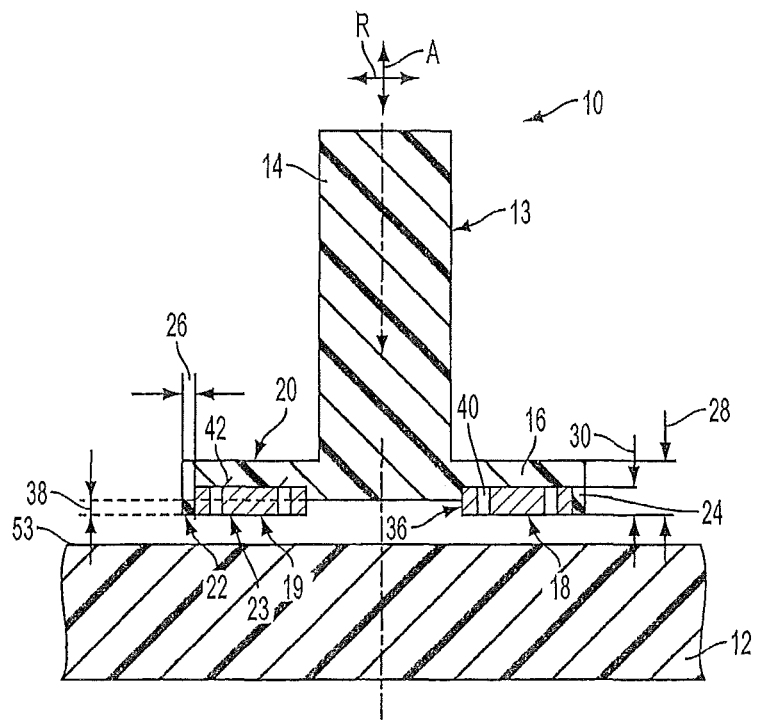
FIG. 1 shows a schematic longitudinal section view through a joining component above a workpiece.
Figure 2:
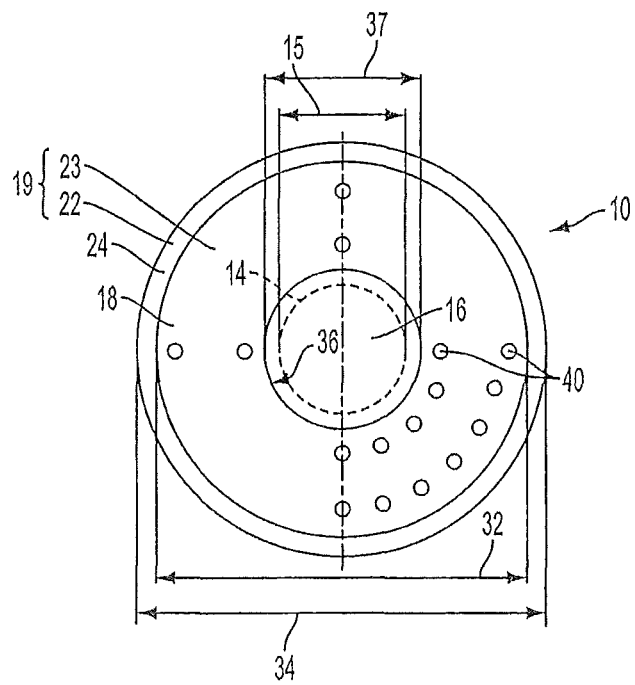
FIG. 2 shows a plan view of the lower face of the joining component shown in FIG. 1.

FIGS. 1 and 2 show a first embodiment of a joining component according to the invention, annotated 10 in general. The joining component 10 is designed to be joined along an axial direction A to a surface of a workpiece 12. The workpiece 12 may be a workpiece composed of any desired material, for example also from metal. However, the workpiece 12 is preferably produced, at least on its surface, from thermoplastic. The workpiece 12 is, for example, a bodywork component of a motor vehicle.

The joining component 10 has a base body 13 composed of a thermoplastic material. The base body 13 contains a holding section 14 which in the present case is formed schematically as a circular shaft section and has a diameter 15. The base body 13 furthermore has a flange section 16 which has a larger diameter than the holding section 14. The joining component 10 is formed onto the workpiece 12 such that the flange section 16 is joined to the surface of the workpiece 12, and the holding section 14 projects beyond the surface of the workpiece 12.

The joining component 10 furthermore has a metal section 18 which is integrated in the flange section 16 of the base body 13. To be more precise, the metal section 18 is integrated in the flange section 16 such that an interlock is achieved between the thermoplastic material of the flange section 16 and the metal section 18, in particular in the radial direction R.

A joining surface, which is placed on the surface of the workpiece 12 at the start of a joining process, is annotated 19 in FIG. 1. This joining surface 19 is in general provided on a lower face 22 of the flange section 16, while in contrast the holding section 14 extends from an upper face 20 of the flange section 16.

The joining surface 19 is formed by a lower face 23 of the metal section 18 and by a rim 24 which surrounds the metal section 18 in the radial direction. The width of the rim 24 in the radial direction R is annotated 26 in FIG. 1. The rim 24 preferably extends as far as the joining surface 19, such that a lower face 22 of the rim 24 together with the lower face 23 of the metal section 18 forms the joining surface 19.

A thickness of the flange section 16 in the axial direction A is annotated 28 in FIG. 1.

The metal section 18 has an axial thickness 30 and an external diameter 32. The flange section 16 has an external diameter 34, as is shown in FIG. 2.

The joining component 10 is preferably designed to be essentially rotationally symmetrical about a longitudinal axis which is aligned parallel to the axial direction A.

The metal section 18 has a central axial aperture 36, whose diameter is shown at 37 in FIG. 2. The diameter 37 of the axial aperture 36 is greater than the diameter 15 of the holding section 14.

In the area of the axial aperture 36, the flange section 16 is axially recessed with respect to the joining surface 19, to be precise by an offset value 38.

In general, the metal section 18 is in the form of a flat section which extends in a direction at right angles to the axial direction A. The central aperture 36 results in the metal section 18 being annular.

The metal section 18 furthermore has a plurality of axial through-holes 40 between its internal diameter 37, which is formed by the axial aperture 36, and its external diameter 32. As is illustrated in FIG. 1, the through-holes 40 can be filled, preferably completely or else only partially, with thermoplastic material of the flange section 16. Alternatively, the holes 40 may also be free of thermoplastic material.

FIG. 1 furthermore schematically indicates that the metal section 18 has a plurality of undercut sections 42. The holes 40 may in this case form undercut sections such as these. However, projections 84 or the like burr 88 can also be formed on the metal section 18, extending into the material of the flange section 16 and thus forming undercut sections 42.

A process for joining the joining component 10 to the workpiece 12 is carried out as follows.

First of all, the joining surface 19 of the component 10 is placed on the surface of the workpiece 12. The metal section 18 is then heated, to be precise to a temperature which may be slightly below or else slightly above the melting point of the thermoplastic material of the base section 13. This results in the thermoplastic material melting in the area around the metal section.

If the workpiece 12 is composed of a material which cannot be melted, for example a metal or a thermosetting plastic carbon fibre material which cannot be melted, the thermoplastic material of the flange section 16 flows onto the surface of the workpiece 12 and forms a close connection to its surface. The heating of the metal element 18 is then ended. The thermoplastic material solidifies and, in consequence, forms a force-fitting connection in the radial direction R to the surface of the workpiece 12.

If the workpiece 12 is likewise produced from a thermoplastic material (at least on its surface), the workpiece surface also melts when the metal section 18 is heated. In this case, the joining component 10 can be pushed axially into the workpiece 12, such that its joining surface 19 enters to a specific penetration depth 52 behind the surface 53 of the workpiece 12. In the process, the melts of the thermoplastic material of the flange section 16 and of the workpiece 12 are mixed. When the heating of the metal section ends, this results in an integral, force-fitting and interlocking connection. Since the integral connection extends at least through the holes 40, this results in an interlock in the axial and/or radial direction R.

In both cases mentioned above, the rim 24 lower face 22 melts when the metal section 18 is heated, such that, on solidification, it forms a bead around the metal section 18 and in consequence surrounds the metal section 18. The metal section 18 is then preferably completely surrounded by the flange section 16 (including its rim 24 lower face 22) and the workpiece 12, thus avoiding corrosion problems.

This becomes even more the case when the rim 24 lower face 22 forms an integral connection with the workpiece 12 when it is joined to a thermoplastic workpiece 12.

The recessing of the flange section 16 in the area of the axial aperture 36 by the offset value 38 allows the joining component 10 to penetrate below the surface of the workpiece 12, even if the flange section 16 does not melt, or does not melt completely, in the area of the axial aperture 36. In this case, the offset value 38 may correspond to the maximum penetration depth.

Further embodiments of joining components according to the invention will be described in the following text. Their design and function in general correspond to the design and the function of the joining component 10 in FIGS. 1 and 2. Identical elements are therefore provided with the same reference numbers. The following text describes only the differences.

Figure 3:
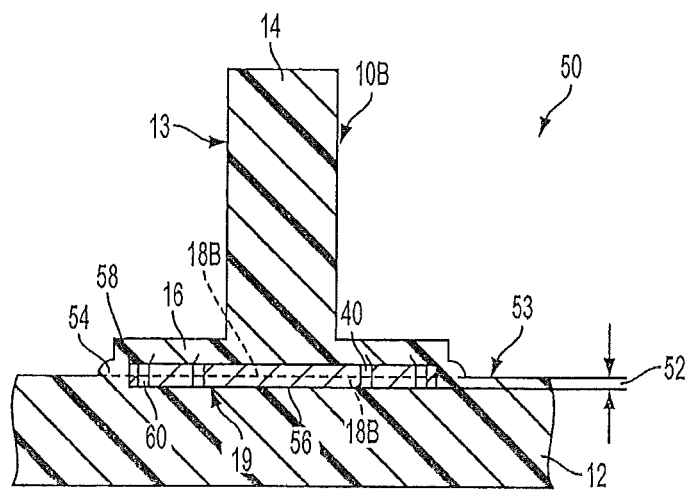
FIG. 3 shows a component pair comprising a joining component according to the invention based on a further embodiment which is joined to a workpiece composed of thermoplastic material.

FIG. 3 shows a component arrangement 50 in which a joining component 10B has been joined to a workpiece 12, with the workpiece 12 being composed of a thermoplastic material, and with the joining surface 19 in consequence having penetrated, in the finished joint connection, by a penetration depth 52 beyond the surface 53 of the workpiece 12.

As can also be seen in FIG. 3, the rim 22 forms a bead 54 around the metal section 18B in the finished joint connection.

In the case of the joining component 10B in FIG. 3, the metal section 18B does not have a central axial aperture 36. The thermoplastic material of the flange section 16 or of the workpiece 12 passes through the holes 40. In the area of the joining surface 19, the joint connection results in a force fit 56 in the radial direction. Because the bead 54 surrounds the metal section 18B, this also results in an interlock 58, at least in the radial direction. Furthermore an integral joint 60 is achieved in the finished joint connection, in the area of the bead 54 and in the area of the holes 40.

Figure 4:
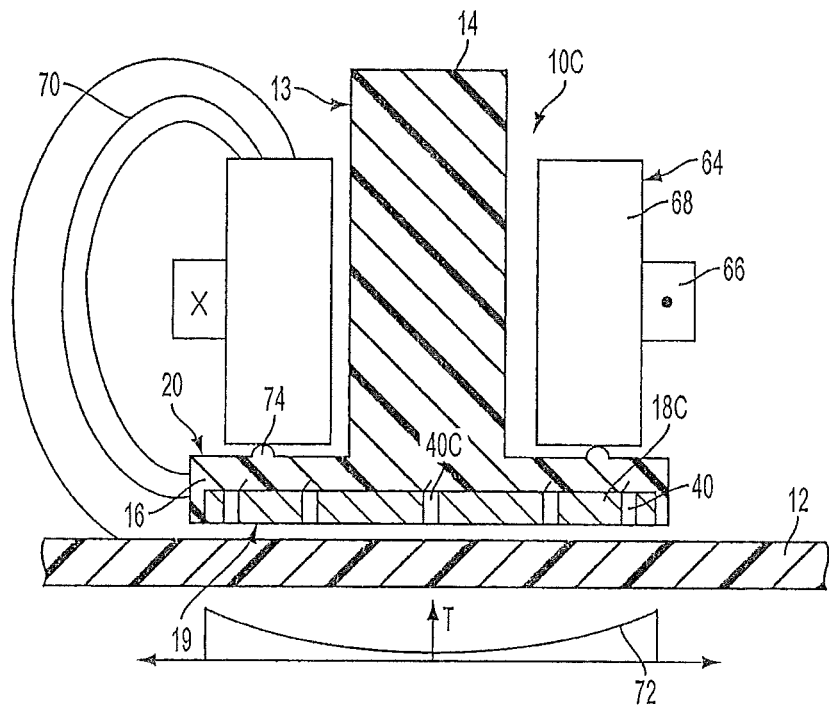
FIG. 4 shows a schematic illustration of a further embodiment of a joining component according to the invention and of a joining tool in order to produce a joint connection to a workpiece which is accessible on one side.

FIG. 4 shows a further embodiment of a joining component 10C according to the invention which does not have a central aperture but a central hole 40C whose size corresponds to the size of the holes 40 in the surrounding rim area.

FIG. 4 shows how a joining tool 64 can be used in order to heat the metal section 18C. The joining tool 64 has an electrical coil 66 by means of which an electromagnetic field can be built up. A field former 68 which is in the form of a sleeve is arranged radially within the coil 66, and its axial end face extends as far as the flange section 16. A magnetic field 70 which is produced by the coil 66 in consequence penetrates in the axial direction into the flange section 16 and into the metal section 18C. This heats the metal section 18C, in order to melt the thermoplastic material.

In this case, the lines of force of the field 70 run such that, although they are introduced into the metal section 18C in the axial direction, they then, however, emerge approximately radially outwards from it in order finally to enter the upper face of the field former 68, which is in the form of a sleeve, again. As is shown in FIG. 4, this results in the temperature distribution in the metal section 18C not being uniform. FIG. 4 shows a distribution of the temperature T in the radial direction, to be precise at 72. The temperature T is generally lower radially inwards than radially outwards. This can be compensated for by the metal section 18C being heated for a sufficiently long time in order to also ensure that the thermoplastic material melts sufficiently in the radially inner part.

However, a more uniform temperature distribution can also be achieved if the shape and number of the holes and their arrangement within the metal section 18C are varied such that the temperature distribution 72 is as uniform as possible in the radial direction.

As is likewise shown in FIG. 4, the flange section 16 has one or more projections 74 on its upper face, that is to say the side 20 facing away from the joining surface 19, the area of which projections 74 is considerably less than the area of the upper face 20. This allows the field former 68 to be placed in a defined position on the flange section 16, specifically onto the tip of the projection 74. In consequence, the field former can assume a defined position with respect to the joining component 10C. Furthermore, the projections prevent the field former 68 from resting on the joining component 10C over a large area. In fact, contact is made with the flange section 16 only via the tips of the projections 74, thus making it possible to prevent the field former 68 from adhering to the flange section 16.

Figure 5:
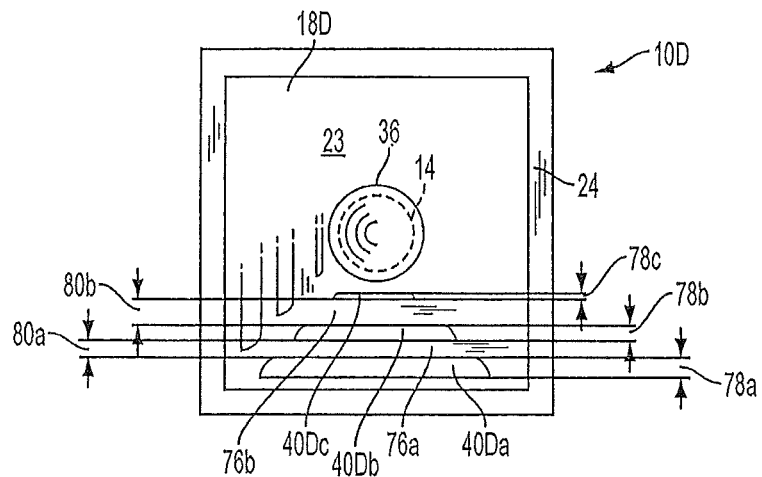
FIG. 5 shows a view of a further embodiment of a joining component according to the invention, from underneath.

FIG. 5 shows an example of a further joining component 10D according to the invention which has an arrangement and distribution of holes 40D which are suitable for this purpose. The flange section 16 in this embodiment may, for example, be circular, but is in this case square. The holding section 14 once again has a circular cross section, but may also have a polygonal shape.

In the metal section 18D, which likewise has an approximately square plan view, a central axial aperture 36 is provided, as in the embodiment shown in FIGS. 1 and 2, as well.

Holes 40Da, 40Db, 40Dc are provided in the remaining rim section and are arranged separated from one another in the radial direction. The holes 40Da, 40Db, 40Dc are each in the form of elongated holes, and are aligned approximately parallel to the side edges of the metal section 18D. If the metal section is circular, the holes may also be in the form of curved elongated holes.

To be more precise, the metal section 18D has four radially outer holes 40Da, four radially central elongated holes 40Db and four radially inner elongated holes 40Dc. For clarity reasons, only one of the respective elongated holes is in each case illustrated in FIG. 5. The radially outer elongated holes 40Da have a greater width 78a in the radial direction than the central elongated holes 40Db, whose width is 78b. The width 78b is in turn less than the radial width 78c of the radially inner elongated holes 40Dc. Furthermore, the width of the webs which are arranged between the elongated holes is also different. The width 80a of the webs 76a between the radially outer elongated holes 40Da and the radially central elongated holes 40Db is less than the width 80b of the webs 76b between the radially central elongated holes 40Db and the radially inner elongated holes 40Dc.

This arrangement makes it possible to achieve largely uniform heating of the metal section 18D in the radial direction, despite the radial concentration of lines of force of the field 70 in the radially outer area. Although fewer lines of force enter the metal section in the radially inner area there is, however, a greater accumulation of material there, in order to also ensure adequate heating in the radially inner area.

Figure 6:
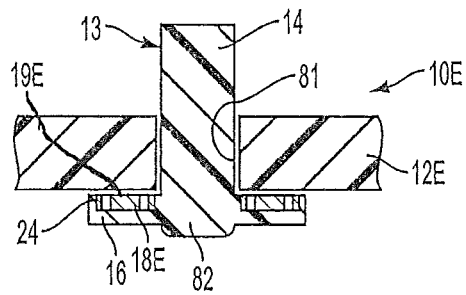
FIG. 6 shows a schematic longitudinal section view through a further embodiment of a joining component according to the invention.

FIG. 6 shows a further alternative embodiment of a joining component 10E according to the invention, which is designed to be joined to a workpiece 12E having a through-hole 81. In this case, the holding section 14 is intended to extend through the through-hole 81. In consequence the metal section 18E is formed on a surface of the flange section 16 which points towards the holding section 14, and forms a joining surface 19E which makes contact with the surface of the workpiece 12E.

In this case, once again, the joining direction is such that the joining surface 19E of the joining component 10E is moved in the axial direction towards the workpiece 12E. In this case, as is shown in FIG. 4, a joining tool can act on that side of the flange section 16 which faces away from the holding section 14. For this purpose, a holding projection 82 can be provided on this side of the flange section, making it easier to hold the joining component 10E in the joining tool.

Figure 7:
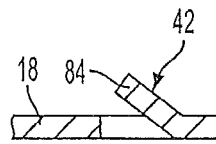
FIG. 7 shows a detail of a metal element of a joining component according to the invention.
Figure 8:
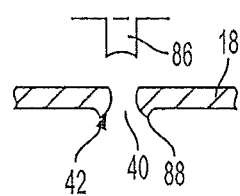
FIG. 8 shows a further detail of a metal element of a joining component according to the invention.

FIGS. 7 and 8 show examples of undercut sections 42 of the metal section 18.

FIG. 7 shows an example in which recesses are formed in the metal section 18, which recesses define tongues 84 which can be bent out with respect to the base plane of the metal section 18 in order in this way to form an undercut section 42.

FIG. 8 shows an example in which a hole 40 is formed in the metal section 18 by means of a stamping tool 86. The stamping tool 86 in this case acts on one face of the metal section 18, such that a stamping burr 88 is formed on the opposite side. In this embodiment, the stamping burr 88 is likewise used as an undercut section.

FIG. 9 shows a further embodiment of a joining component 10F which can be joined to a workpiece 12F with a round surface, such as a tube. For this purpose, the flange section 16F is not flat but is curved, to be precise matched to the curvature of the surface of the workpiece 12F.

The joining component 10F furthermore has projections 74 like the joining component 10 in FIG. 4. These can be shaped such that they form a planar contact surface at right angles to the axial axis A in order to ensure correct alignment of the joining component 10F in the joining tool in the axial direction. Furthermore, the joining component 10F can be formed with a positioning section 90 which, for example, is provided on the lower section of the holding section 14. By way of example, the positioning section 90 can preferably have an irregular cross section, or else may be shaped in the form of a regular polygon, thus making it possible to also ensure correct positioning of the joining component 10F in the circumferential direction around the axial axis A, when the joining component 10F has already been positioned correctly at the time of taking up the joining component 10 in the joining tool. With a suitable drive, this makes it possible to ensure that the joining component 10F is in a clear and correct position with respect to the workpiece 12F, before it is placed on the workpiece 12F.

FIG. 10 shows a further embodiment of a joining component 10G according to the invention. The joining component 10G is designed such that it can make a joint connection with the workpiece 12, in which joint connection it is possible to achieve a specific joining-point holding force 96.

If a force 94 is now exerted on the holding section 14, for example in the radial direction (the force 94 may also be aligned in the axial direction opposite the holding force 96), then the joining component 100 is formed such that either the holding section 14 breaks when excessive force is exerted or else the holding section 14 breaks in the area of the junction to the flange section 16. This makes it possible to ensure that, if not loaded correctly, the joint connection will not be destroyed once it has been produced, that is to say no material will be torn off the workpiece 12. If an incorrect load such as this has taken place and the holding section 14 breaks, then the remaining joining component 100 can then be detached from the workpiece 12 in a controlled manner by heating in order subsequently to join an intact joining component 100 to a repair point such as this. For this purpose, the joining component 10G can be formed with a weak area 92 in the area of the junction between the holding section 14 and the flange section 16, in order to ensure that the holding section 14 breaks off in a defined manner.

FIG. 11 shows a further embodiment of a joining component 10H according to the invention, which is designed for its flange section 16H to be joined between two workpieces 12Ha, 12Hb. In this case, the flange section 16H has a respective metal section 18Ha and 18Hb both on its upper face and on its lower face. In a corresponding manner, the flange section 16H has a lower joining surface 19Ha and an upper joining surface 19Hb. When a joining tool 64 is applied from the side of the holding section 14 or else from the opposite side, this makes it possible to ensure that both metal sections 18Ha, 18Hb are heated in order in each case to make a joint connection with the mutually opposite surfaces of the workpieces 12Ha, 12Hb.

FIG. 12 shows a further embodiment of a joining component 10I according to the invention which is designed such that the metal part 18 of the flange section 16 is completely extrusion coated with thermoplastic. In consequence, the surface 191 of the flange section 16 in the joining zone 100 is composed exclusively of thermoplastic with thin walls, preferably of 100 µm to 300 µm. This thin thermoplastic layer 99 melts when inductively heated and forms a predominantly force-fitting connection between the joining component 10I and the workpiece 12 which, in this example, can preferably be composed of glass, metal or a thermosetting plastic material reinforced with carbon fibres or glass fibres.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A joining component for axial joining to a workpiece, the joining component comprising a base body composed of a thermoplastic material and including a holding section and a flange section, and the flange section includes an underside opposite to the holding section, and the joining component further includes an inductively heatable metal section joined to and exposed on the underside of the flange, and the metal section defines a radially inward axial aperture and includes an exposed metal surface facing away from the holding section, and the flange further includes a rim radially outward of and radially surrounding the metal section and extending axially to the metal surface, and an axially lower face of the rim and the exposed metal surface of the metal section comprise a joining surface, and the flange section within the axial aperture of the metal section is axially recessed by an offset depth with respect to the joining surface.

2. The joining component according to claim 1, characterized in that the offset depth is smaller than an axial thickness of the flange section.

3. The joining component according to claim 1, characterized in that the offset depth is smaller than an axial thickness of the metal section.

4. The joining component according to claim 1, characterized in that the holding section has a shaft section which is connected to the flange section, with an external diameter of the shaft section being less than a diameter of the aperture.

5. The joining component according to claim 1, characterized in that the metal section has at least one axial hole.

6. The joining component according to claim 5, characterized in that the metal section has a plurality of axial through-holes.

7. The joining component according to claim 6, characterized in that at least two through-holes are arranged offset with respect to one another in the radial direction, with a radially outer hole being larger than a radially inner hole.

8. The joining component according to claim 6, characterized in that at least two through-holes are arranged offset with respect to one another in the radial direction, with a radial distance between the outer holes being less than a radial distance between the inner holes.

9. The joining component according to claim 6, characterized in that the least one through-hole includes a stamping burr projecting into the flange section.

10. The joining component according to claim 1, characterized in that the metal section includes an anticorrosion coating.

11. The joining component according to claim 1, characterized in that the flange section has at least one axial projection on an outer surface opposite the joining surface, and the area of the axial projection is very much smaller than the outer surface.

12. The joining component according to claim 11, characterized in that the joining surface is formed on a side of the flange section pointing towards the holding section, with the flange section preferably having a holding projection on a side pointing away from the holding section.

13. The joining component according to claim 1, characterized in that the ratio of an axial thickness of the metal section to an axial thickness of the flange section is in the range from 1:2 to 1:10.

14. The joining component according to claim 1, characterized in that the metal section is ferromagnetic.

15. The joining component according to claim 1, characterized in that the ratio of an axial thickness of the metal section to an axial thickness of the flange section is in the range from 1:3 to 1:6.

16. A joining component for joining to a workpiece, the joining component comprising:
    a base body composed of a thermoplastic material and including:
        a holding section formed as a cylindrical shaft including a first end and defining a first diameter;
        a flange section formed unitary with the holding section at the first end of the holding section, the flange section including a first side and a second side and the holding section projects axially from the first side, and the flange section defines a second diameter larger than the first diameter;
    a metal section, the metal section being inductively heatable and having an inner side joined to the flange section and an exposed outer side facing away from the flange section, the metal section also defining an axial through aperture, and radially within the aperture a first surface of the second side of the flange section is axially recessed by an offset depth with respect to the outer side of the metal section; and
    wherein a joining surface includes the outer side of the metal section and a second surface of the second side of the flange section radially outward of the metal section.

17. The joining component according to claim 16, wherein the offset depth is smaller than an axial thickness of the flange section.

18. The joining component according to claim 16, wherein the offset depth is smaller than an axial thickness of the metal section.

19. The joining component according to claim 16, wherein the ratio of an axial thickness of the metal section to an axial thickness of the flange section is in the range from 1:2 to 1:10.

* * * * *